United States Patent Office 3,487,040
Patented Dec. 30, 1969

3,487,040
POLYMERS CONTAINING BROMINATED DIPHEN-
YLSULFIDES AS FIRE RETARDANTS
Zvi Enrico Jolles, St. Albans, England, assignor to
F. W. Berk & Company Limited
No Drawing. Original application Sept. 22, 1964, Ser. No.
398,428, now Patent No. 3,387,040, dated June 4, 1968.
Divided and this application Jan. 24, 1968, Ser. No.
699,996
Claims priority, application Great Britain, Sept. 23, 1963,
37,288/63
Int. Cl. C09k 3/28; C08f 45/58, 51/58
U.S. Cl. 260—37
6 Claims

ABSTRACT OF THE DISCLOSURE

A wide variety of polymer compositions can be rendered fire retardant by the incorporation therein of certain halogenated diphenylsulfides, preferred compounds being tetrabromo-diphenylsulfide, hexabromo-diphenyl-sulfide and tetrabromo-dichloro-diphenylsulfide. The amount of halogenated diphenylsulfide is suitably up to 10% by weight of the polymer, preferably 1 to 5% by weight. Preferred polymer compositions additionally contain up to 5% by weight of antimony bioxide.

The foregoing halogenated diphenylsulfides are the subject of application Ser. No. 398,428 filed Sept. 22, 1964 by Zvi E. Jolles, now Patent No. 3,387,040, of which the present application is a division.

This invention is concerned with polymer compositions having fire retardant properties.

It has been found that certain halogenated diphenyl-sulfides, namely tetrabromo-diphenylsulfide, hexabromo-diphenylsulfide, tetrabromo-dichloro-diphenylsulfide and dibromo-dichloro-diphenylsulfide, are effective fire retardant agents for a wide variety of synthetic polymer compositions. The halogenated diphenylsulfides are preferably, but not essentially, symmetrical in that equal numbers of halogen substituents are present in the two benzene nuclei. The symmetrical form of these compounds may be represented by the formula

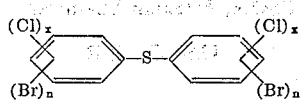

where x is 0 or 1, and n is 2 or 3 when x is 0, and is 1 or 2 when x is 1.

Preferred compounds within this general formula are those in which the halogen substituents are located in the ortho and/or para positions of the phenyl ring relative to the sulphide substituent, that is in the 2,2′,4,4′-positions in the case of a tetra-substituted diphenylsulfide and in the 2,2′,4,4′,6,6′-positions in the case of a hexa-substituted compound.

Among the synthetic polymers in which said halogenated diphenylsulfides are usefully incorporated as fire retardant agents are, for example, polyolefins, such as polyethylene (both low and high density) and polypropylene; polyvinyl compounds, such as polystyrene, polyvinyl acetate and polyvinyl chloride; polyesters, such as polyethylene terephthalate; polyamides, such as nylon; polyurethanes (both flexible and rigid); epoxy resins; polyvinylidene compounds and polymers of allyl compounds. The halogenated diphenylsulfides may be incorporated in the polymer compositions in any suitable way and the method employed will normally depend upon the particular polymer treated. Thus with some polymers, such as polyolefins and polyvinyl compounds, it will normally be preferred to incorporate the fire retardant agent in an already formed polymer together with any other additives, such as stabilizers, plasticizers and anti-static agents, while with other polymers, such as polyurethanes, it will normally be preferred to incorporate the fire retardant agent during synthesis of the polymer, that is by including it in the reaction mixture.

The amount of halogenated diphenylsulfide required to impart adequate fire retardant properties will also depend upon the nature of the particular polymer; suitable proportions are generally below 10% based on the weight of the polymer and in many cases from 1 to 5% by weight is satisfactory. The halogenated diphenylsulfides may, if desired, be used in association with other fire retardant agents and it is particularly advantageous to use them together with antimony trioxide as the latter, while imparting only slight fire retardant properties when used in small proportions (i.e. less than about 5%) by itself, considerably increases the effectiveness of the halogenated diphenylsulfides, enabling a smaller proportion of the latter to be used.

In order that the invention may be more fully understood, the following examples are given by way of illustration only:

EXAMPLE 1

The additives listed below were mixed, in the proportions stated, with low density polyethylene sold under the trade mark "Alkathene" WNG 14 by I.C.I. Ltd. and moulded into sheets measuring 6 x 6 x ⅛ inches. The sheets were then cut into strips measuring 6 x ¾ x ⅛ inches and subjected to fire retardant testing.

The fire retardant test adopted, a modified form of A.S.T.M. D-635 56T Part 9 (1958) for flammability of rigid plastics, was as follows:

Each test strip was marked 1 inch and 4 inches from one end thereof. The test strip was clamped in a support with its longitudinal axis horizontal and its transverse axis inclined at 45° to the horizontal; the test strip was then placed in a fume hood through which a slight draught was allowed to pass to ensure an adequate oxygen supply and removal of combustion products. An ignited standard micro-burner of ⅛ inch diameter with air ports open to produce a blue flame approximately 1 inch high was so placed that the top of the flame contacted the free end of the test strip for 5 seconds. In those tests in which the test strip did not continue to burn after removal of the burner flame, the flame was immediately re-applied to the free end of the test strip for a second period of 5 seconds. After removal of the burner flame it was extinguished and the hood door closed for the remainder of the test.

Those test strips which did not burn to the 1 inch mark within 1 second were classified as "non-burning" ("NB"), whereas those which burnt beyond the 1 inch mark but no further than the inch mark were classified as "self-extinguishing" ("SE"); test strips which burnt beyond the 4 inch mark were classified as "burning." The time of burning was recorded starting from the time the flame reached the 1 inch mark until it was extinguished.

The extent of burning between the 1 inch and 4 inch marks was also noted: the extent of burning of test pieces which did not burn up to the 1 inch mark was recorded as "NRIM." All references to "non-burning," and "self-extinguishing," and "burning" are to be construed in accordance with the above classification.

The results obtained were as follows:

| Additive | Percent W/W | AO percent W/W | Extent of burning; inches | Time of burning; seconds | | Rate of burning in./min. | ASTM classification |
|---|---|---|---|---|---|---|---|
| | | | | 1st Ignition | 2nd Ignition | | |
| TBDPS | 5.5 | 3.3 | NRIM | 14.4 | 138 | | SE |
| | 10.1 | 6.0 | NRIM | 0 | 1 | | SE/NB |
| | 9.9 | 0 | 0.4 | 16.0 | | 0.16 | SE |
| HBDPS | 4.9 | 3.0 | RNIM | 2 | 19 | | SE |
| | 9.1 | 0 | 0.8 | 205 | | 0.17 | SE |

TBDPS=Tetrabromo-diphenylsulfide; HBDPS=Hexabromo-diphenylsulfide; AO=Antimony trioxide.

EXAMPLE 2

100 parts of a polyester resin sold under the trademark "Daltolac" 21 by I.C.I. Ltd., 4 parts of water and 1 part of a non-ionic polyoxyethylene condensate surface active agent sold under the trade mark "Lissapol" N, were thoroughly mixed together. The mixture thus obtained was added to a separately prepared mixture consisting of 120 parts of diisocyanato-methane sold under the trade mark "Suprasec" D by I.C.I. Ltd., in which there had been thoroughly dispersed a selected proportion of the fire retardant agent and an amount of antimony trioxide such that the polyurethane product contained 2.5% by weight thereof, the fire retardant agent and the antimony trioxide having been previously ground to pass a 100 mesh B.S. sieve. The whole of the mixture was then stirred vigorously and poured into a suitable mould.

Foaming continued for ten minutes and in a further thirty minutes the foam set. The foam was allowed to cure at room temperature for at least 5 days and was then cut into test pieces 6 inches long and of 1 inch square cross-section for fire retardancy tests.

The fire retardancy tests were carried out as described in Example 1 and the results obtained may be summarised as follows:

(a) Using tetrabromo-diphenylsulfide as fire retardant agent (i) 0.8%+2.5% antimony trioxide—self-extinguishing.

(ii) 4.4%+2.5% antimony trioxide—non-burning.

(b) Using hexabromo-diphenylsulfide as fire retardant agent (i) 0.7%+2.5% antimony trioxide—self-extinguishing.

(ii) 3.9%+2.5% antimony trioxide—non-burning.

The foregoing summarises the results of many tests of the kind given in full in Example 1, using various proportions of the fire retardant agents and the above concentrations of brominated diphenylsulfide represent the minimum concentrations required to produce a self-extinguishing or a non-burning product, respectively, when using 2.5% of antimony trioxide.

I claim:

1. A synthetic polymer composition having fire retardant properties, which comprises a synthetic organic polymer having dispersed therein up to 10%, based on the weight of the polymer, of a halogenated diphenylsulfide of the formula:

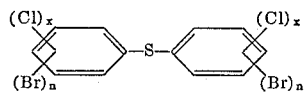

where $x$ is an integer from 0 to 1, and $n$ is an integer from 2 to 3 when $x$ is 0 and is an integer from 1 to 2 when $x$ is 1.

2. A synthetic polymer composition according to claim 1, which comprises from 1 to 5% by weight of said halogenated diphenylsulfide.

3. A synthetic polymer composition according to claim 1, which also comprises up to 5%, based on the weight of the polymer, of antimony trioxide.

4. A synthetic polymer composition having fire retardant properties, which comprises a synthetic organic polymer having dispersed therein up to 10%, based on the weight of the polymer, of a halogenated diphenylsulfide selected from the group consisting of tetrabromo-diphenylsulfide and hexabromo-diphenylsulfide.

5. A synthetic polymer composition according to claim 4, which comprises from 1 to 5% by weight of said halogenated diphenylsulfide.

6. A synthetic polymer composition according to claim 4, which also comprises up to 5%, based on the weight of the polymer, of antimony trioxide.

References Cited

UNITED STATES PATENTS

| 2,480,298 | 8/1949 | Happoldt | 260—28.5 |
| 3,205,196 | 9/1965 | Creighton | 260—45.75 |

MORRIS LIEBMAN, Primary Examiner

SANDRA PERSON, Assistant Examiner

U.S. Cl. X.R.

260—40, 41